United States Patent
Ting

(10) Patent No.: US 8,063,684 B2
(45) Date of Patent: Nov. 22, 2011

(54) PULSE WIDTH MODULATED CONTROLLER APPLIED TO SWITCH-TYPE VOLTAGE REGULATOR

(75) Inventor: Ming-Chiang Ting, Hsinchu (TW)

(73) Assignee: Niko Semiconductor Co., Ltd. (TW)

( * ) Notice: Subject to any disclaimer, the term of this patent is extended or adjusted under 35 U.S.C. 154(b) by 44 days.

(21) Appl. No.: 12/099,208

(22) Filed: Apr. 8, 2008

(65) Prior Publication Data
US 2009/0027028 A1    Jan. 29, 2009

(30) Foreign Application Priority Data
Jul. 27, 2007  (TW) ............................... 96127641 A

(51) Int. Cl.
*H03K 3/017* (2006.01)
*H03K 5/04* (2006.01)
*H03K 7/08* (2006.01)

(52) U.S. Cl. ........................................ 327/175; 323/284
(58) Field of Classification Search .................. 273/175; 327/175, 172; 323/276, 282–285
See application file for complete search history.

(56) References Cited

U.S. PATENT DOCUMENTS

| 5,313,146 A * | 5/1994 | Koblitz .......................... 315/403 |
| 6,483,383 B2 * | 11/2002 | Wu ................................. 330/253 |
| 7,002,330 B2 * | 2/2006 | Kitani et al. .................. 323/284 |

* cited by examiner

*Primary Examiner* — Lincoln Donovan
*Assistant Examiner* — Diana J Cheng
(74) *Attorney, Agent, or Firm* — Schmeiser, Olsen & Watts, LLP

(57) ABSTRACT

A PWM controller applied to switch-type voltage regulator includes an error amplifier, a soft-start control circuit, a compensating load and a comparator. The error amplifier receives a reference voltage signal and a feedback voltage signal and outputs an error current signal according to the received feedback voltage signal and the reference voltage signal. The soft-start control circuit outputs a compensating current signal according to at least one soft-start control signal. The compensating load receives the error current signal and the compensating current signal, and outputs a compensating signal. The comparator receives a ramp signal and the compensating signal, and outputs a pulse width modulated (PWM) signal. When a supply voltage rises, the error amplifier is compensated with a preset soft-start compensating current to a circuit common ground VSS, so that the error signal slowly rises during the soft-start control process. Therefore, the function of soft-starting is effectuated.

4 Claims, 8 Drawing Sheets

PULSE WIDTH MODULATED CONTROLLER APPLIED TO SWITCH-TYPE VOLTAGE REGULATOR

FIELD OF THE INVENTION

The present invention relates to soft starting, and more particularly to soft starting of a switch-type voltage regulator.

BACKGROUND OF THE INVENTION

In conventional switch-type voltage regulators, when the supply voltage VDD rises, the pulse width modulated (PWM) signal has the largest duty cycle at the very beginning due to the error amplifier thereof having an excessively high gain. It results that the input power supply quickly transmits energy into the power conversion module at an output end thereof. This will cause damages to the power conversion system by overvoltage and overcurrent. Therefore, it is necessary to soft-start the switch-type voltage regulator, in order to exactly protect the power conversion system.

FIG. 1 shows a conventional soft-start circuit 12 consisting of a resistor 121, a capacitor 122, and two Zener diodes 123, 124 to effectuate soft starting. In the circuit 10 shown in FIG. 1, when a supply voltage VDD (not shown) is about to rise, the error amplifier 11 outputs an error signal ERR to discharge via the capacitor 122 and the Zener diode 124 to the circuit common ground VSS; and when the supply voltage VDD rises, a reference voltage REF starts charging the capacitor 122 via the resistor 121 with a charging time constant of $\tau = R1*C1$. When the capacitor 122 is fully charged, the Zener diode 124 will be reverse biased, so that the output of the comparator 13 is isolated from and no longer affected by the soft-start circuit 12 to achieve the purpose of soft starting the converter. Since a relatively large charging time constant is required, relatively large resistance value at the resistor 121 and capacitance value at the capacitor 122 are required. Therefore, in general application, the capacitor 122 is usually externally connected to the circuit to save the integrated circuit chip area. However, by doing this, the number of externally connected elements and the number of packaged pins are increased at the same time.

FIG. 2 shows another conventional soft-start circuit 22 consisting of a resistor 221, a capacitor 222, and an input buffer 223 to effectuate soft starting. In the circuit 20 shown in FIG. 2, since the resistor 221 and the capacitor 222 are charged by a supply voltage VDD with a charging time constant of $\tau = R2*C2$, the capacitor 222 has a voltage level VC that rises from a circuit common ground VSS when the supply voltage VDD rises. The voltage REF2 input at the non-inverting terminal of the error amplifier 21 refers to the voltage level VC of the capacitor 222 when the supply voltage VDD rises, so that the error amplifier 21 compares the voltage FB2 input at the inverting terminal thereof with the voltage level VC of the capacitor 222. When the capacitor 222 is fully charged, it no longer affects the error amplifier 21, so that the output of the comparator 23 is isolated from and no longer affected by the soft-start circuit 22. It achieves the purpose of soft starting the converter by the above-mentioned process. Similarly, since the conventional soft-start circuit 22 shown in FIG. 2 requires a relatively large charging time constant, relatively large resistance value at the resistor 221 and capacitance value at the capacitor 222 are required. Therefore, in general application, the capacitor 122 is usually externally connected to the circuit to save the integrated circuit chip area. However, by doing this, the number of externally connected elements and the number of packaged pins are increased at the same time.

SUMMARY OF THE INVENTION

A primary object of the present invention is to provide a way of soft starting, in which an output port of an error amplifier is controlled to effectuate the function of soft starting and achieve the purpose of highly integrated circuit within a small area.

To achieve the above and other objects, the present invention provides a pulse width modulated (PWM) controller applied to a switch-type voltage regulator. The PWM controller includes an error amplifier, a soft-start control circuit, a compensating load, and a comparator. The error amplifier receives a reference voltage signal and a feedback voltage signal and outputs an error current signal according to the received signals. The soft-start control circuit outputs a compensating current signal according to at least one soft-start control signal. The compensating load receives the error current signal and the compensating current signal, and outputs a compensating signal. The comparator receives a ramp signal and the compensating signal, and outputs a pulse width modulated (PWM) signal.

When a supply voltage rises, the error amplifier is compensated with a preset soft-start compensating current to a circuit common ground VSS, so that the error signal rises slowly until the soft-start control cycle ends. Therefore, the function of soft-starting is effectuated at the time the supply voltage VDD rises.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

The spirit of the present invention is using a transconductance amplifier as an error amplifier, and controlling the output current of the transconductance amplifier immediately after a switch-type voltage regulator is started, so that the output current gradually rises to slowly charge a compensating load. In this manner, the PWM output signal from a PWM comparator may have a softly raised duty cycle to thereby prevent the switch-type voltage regulator from damaging power elements due to overvoltage and overcurrent at the time of starting.

A soft-start circuit applied to switch-type voltage regulator according to a preferred embodiment of the present invention will now be described in more details with reference to the accompanying drawings.

Figure 1:
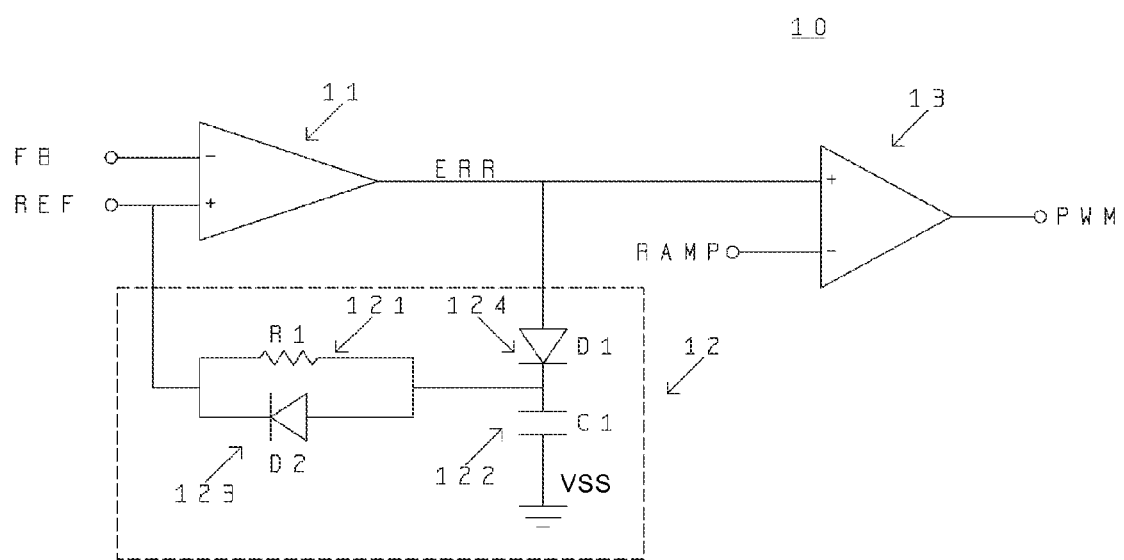
FIG. 1 shows a conventional soft-start circuit consisting of a resistor, a capacitor, and two Zener diodes.
Figure 2:
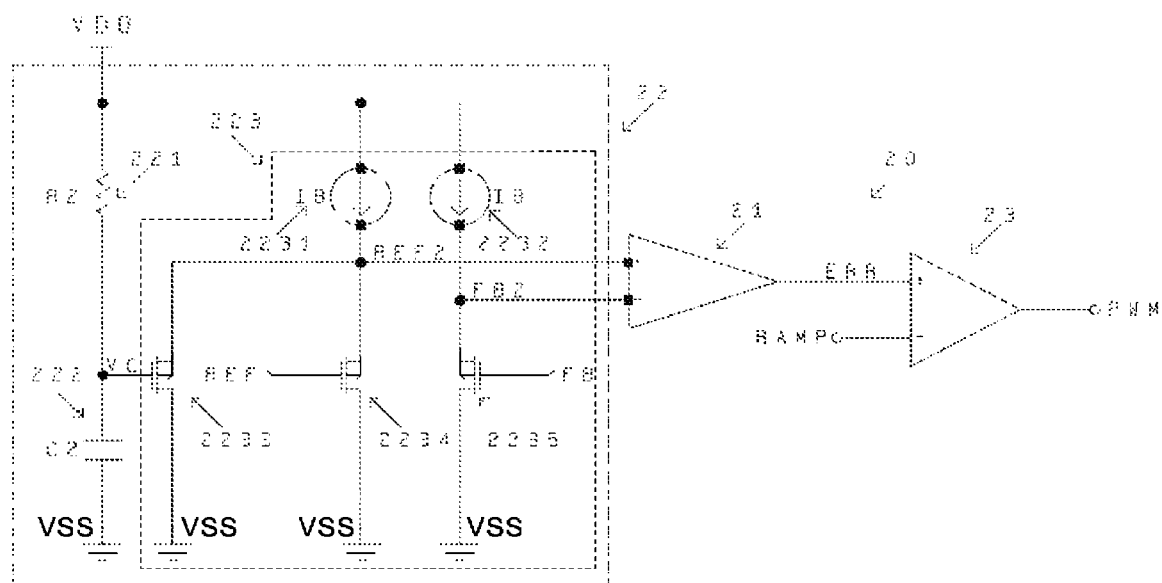
FIG. 2 shows another conventional soft-start circuit consisting of a resistor, a capacitor, and an input buffer.
Figure 3:
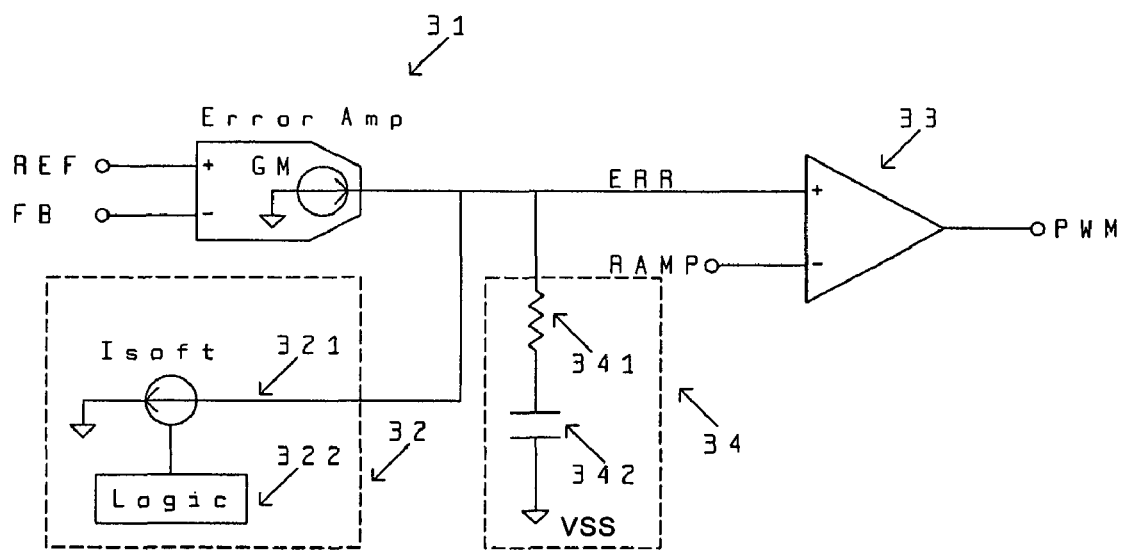
FIG. 3 is a circuit diagram of a PWM controller applied to switch-type voltage regulator according to a preferred embodiment of the present invention.

Please refer to FIG. 3 that shows a circuit diagram of a pulse width modulated (PWM) controller applied to switch-type a voltage regulator according to a preferred embodiment of the present invention. As shown, in the circuit 30 of FIG. 3 for soft starting, an error amplifier 31 compares a reference voltage REF with a feedback signal FB indicative of output of a switch-type voltage regulator to generate an error signal ERR. Wherein, the error amplifier 31 is a transconductance amplifier. Meanwhile, a soft-start control circuit 32 controls an output current of the error amplifier 31, so that the output current charges a compensating load 34 slowly. Wherein, the compensating load 34 may be effectuated by connecting a conventional resistor 341 to a capacitor 342 in series, so that the error signal ERR output by the error amplifier 31 rises gradually. Wherein, the soft-start control circuit 32 consists of a digital control circuit 322 and a compensating current 321. Meanwhile, a comparator 33 is used to compare the above-mentioned error signal ERR with a ramp signal RAMP to generate a pulse width modulated (PWM) signal, which is used to regulate and control the switch-type voltage regulator. Wherein, the comparator 33 may be effectuated by a conventional operational amplifier. Since the error signal ERR is controlled to rise up gradually, the PWM signal output by the comparator 33 is characterized by a duty cycle that rises slowly. Therefore, the purpose of soft starting is achieved.

Figure 4:
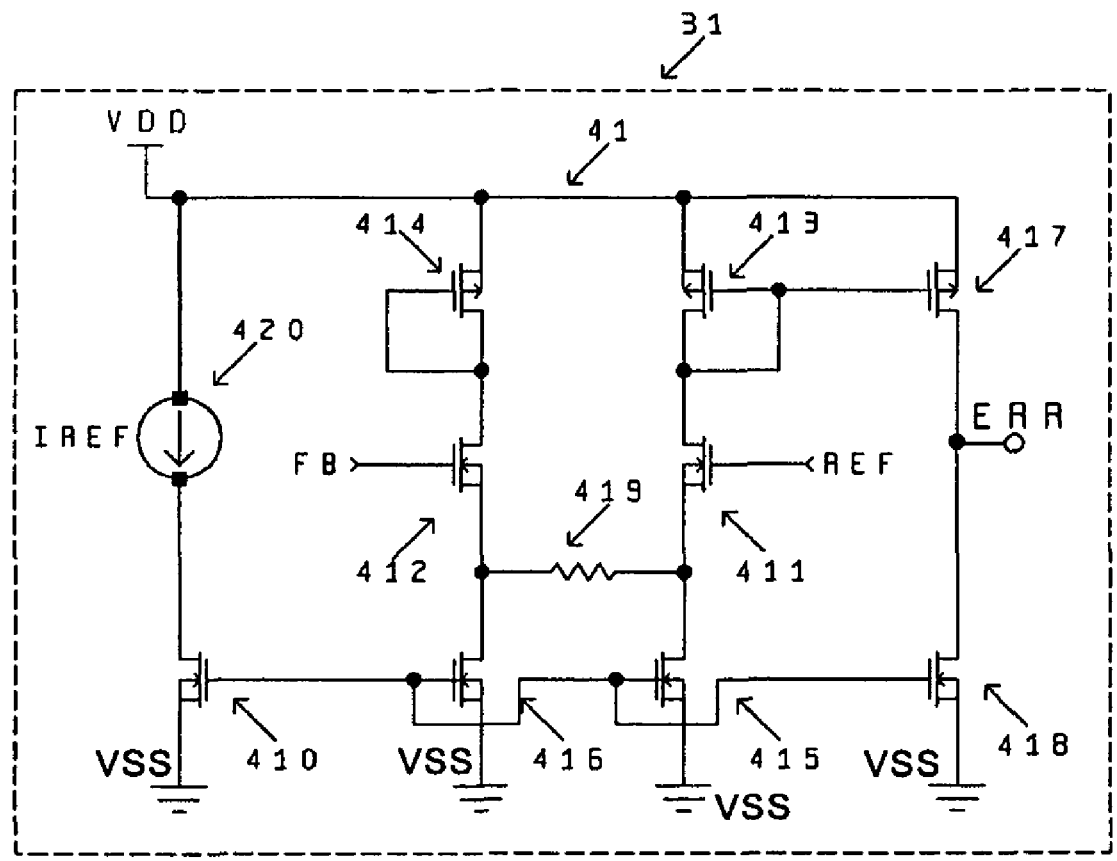
FIG. 4 is a circuit diagram of an error amplifier shown in FIG. 3.

FIG. 4 is a circuit diagram of an embodiment of the error amplifier 31 shown in FIG. 3. As shown, a transconductance error amplifying unit includes two transistors 411, 412 that make up a differential amplifying pair, and a resistor 419 constituting a transconductance source. A reference current source 420 and transistors 410, 415, 416, 418 together form bias current sources; and transistors 413, 414 together constitute an active load. Wherein, the transistor 413 is used to transmit a differential current, which is generated by the differential amplifying pair (i.e. the transistors 411, 412) via the resistor 419 when the differential amplifying pair has compared the reference voltage REF with the feedback signal FB indicative of output of the voltage regulator; the transistor 414 is a symmetrical load to effectuate symmetric differential amplification; and a transistor 417 together with the above-mentioned transistor 413 form a current mirror for outputting current. A value of the output current of the error amplifier 31 is determined according to the bias current source of the above-mentioned transistor 418.

Figure 5:
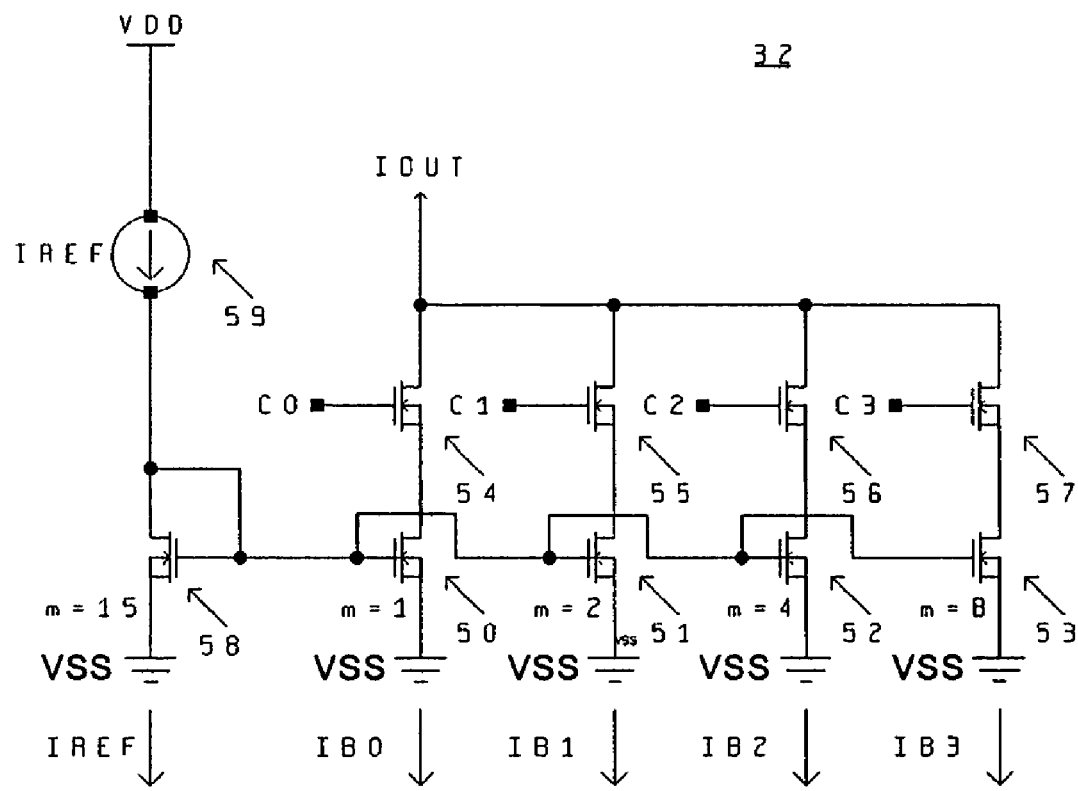
FIG. 5 is a circuit diagram of a soft-start control circuit shown in FIG. 3.

FIG. 5 is a circuit diagram of an embodiment of the soft-start control circuit 32 shown in FIG. 3. As shown, the soft-start control circuit 32 uses a reference current source 59 and a transistor 58 to make up an input bias current source. Moreover, transistors 50, 51, 52, 53 constitute a 4-bit controlled output bias current source each, and have a particular aspect ratio each, such as, for example, m=1, m=2, m=4, and m=8, respectively. Transistors 54, 55, 56, 57 separately form an output current control switch to control the value of output current IOUT according to digital control signals C0, C1, C2, C3, respectively. When all the transistors 54, 55, 56, 57 are off, there will be a smallest output current IOUT value and there is not output current. And, when all the transistors 54, 55, 56, 57 are on, there will be a largest output current IOUT value, which is the sum of the current from the transistors 50, 51, 52, 53. At the very beginning of a soft-start control cycle, the digital control signals C0, C1, C2 and C3 control all the four transistors 54, 55, 56, 57 to be on. Then, the on and off of the four transistors 54, 55, 56, 57 is regulated with time by the digital control signals C0, C1, C2 and C3, so that the output current IOUT is controlled to reduce with time; and at the predetermined ending of the soft-start control cycle, all the four transistor 54, 55, 56 and 57 are off to have an output current IOUT value of zero.

Figure 6:
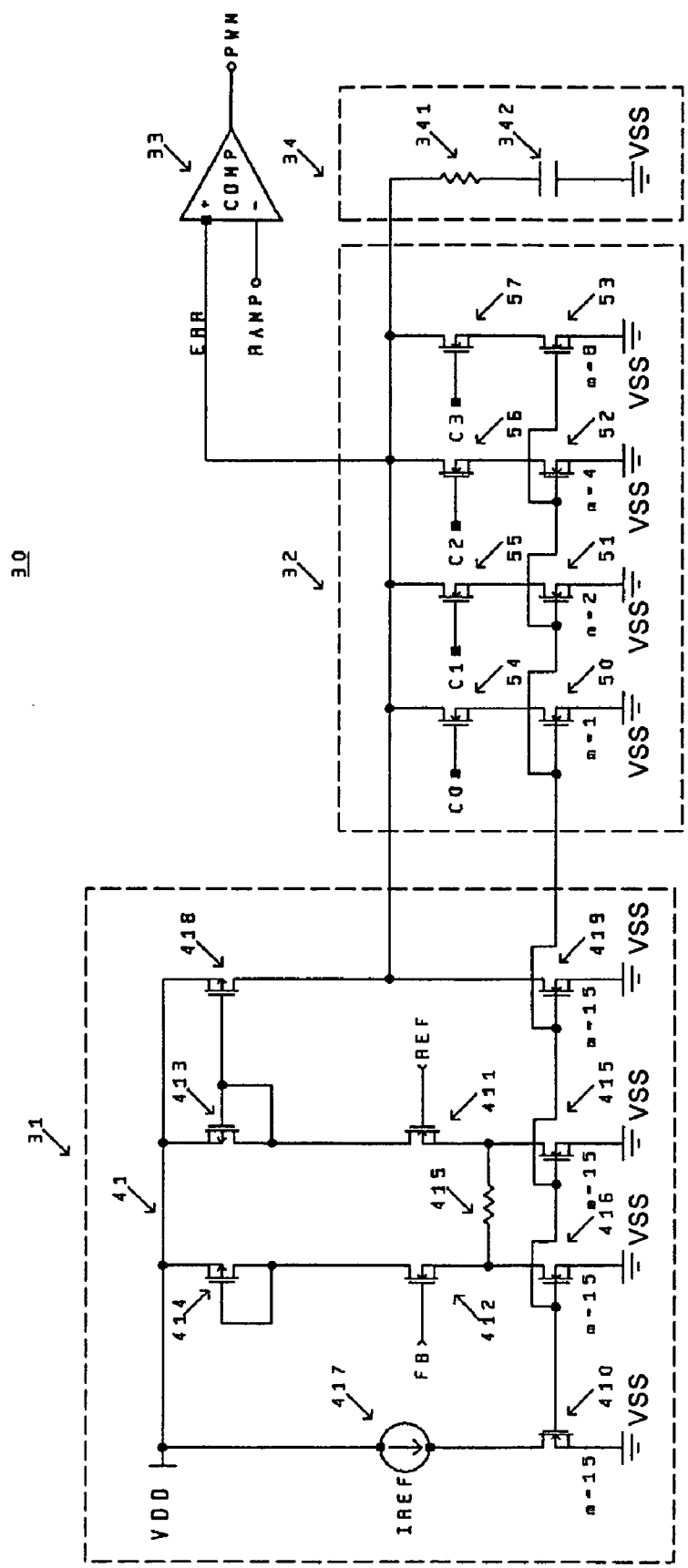
FIG. 6 is a detailed circuit diagram of the circuit for the PWM controller applied to switch-type voltage regulator according to the present invention.

FIG. 6 is a detailed circuit diagram of the circuit 30 for the PWM controller applied to soft starting switch-type voltage regulator according to the present invention. In the illustrated embodiment, the soft-start control circuit 32 uses the output current of the error amplifier 31 as the reference current source 59. When the supply voltage VDD rises, the feedback signal FB indicative of output of the switch-type voltage regulator is smaller than the reference voltage REF, and the error amplifier 31 will output error current to charge the compensating load 34. Meanwhile, the soft-start control starts, so that the soft-start control circuit 32 discharges to the compensating load 34 to fully compensate the error current output by the error amplifier 31, and the output error signal ERR is controlled to gradually rise from the circuit common ground VSS. Then, the comparator 33 compares the error signal ERR with a ramp signal RAMP to generate a pulse width modulated signal PWM having a duty cycle that rises slowly, so as to achieve the purpose of soft starting. When the soft-start control ends, the soft-start control circuit 32 no longer compensates the output error current of the error amplifier 31, so that the output error signal ERR makes proper modulation according to the output load condition of the switch-type voltage regulator to thereby achieve the purpose of isolating the soft starting from the normal operation of the switch-type voltage regulator.

Figure 7:
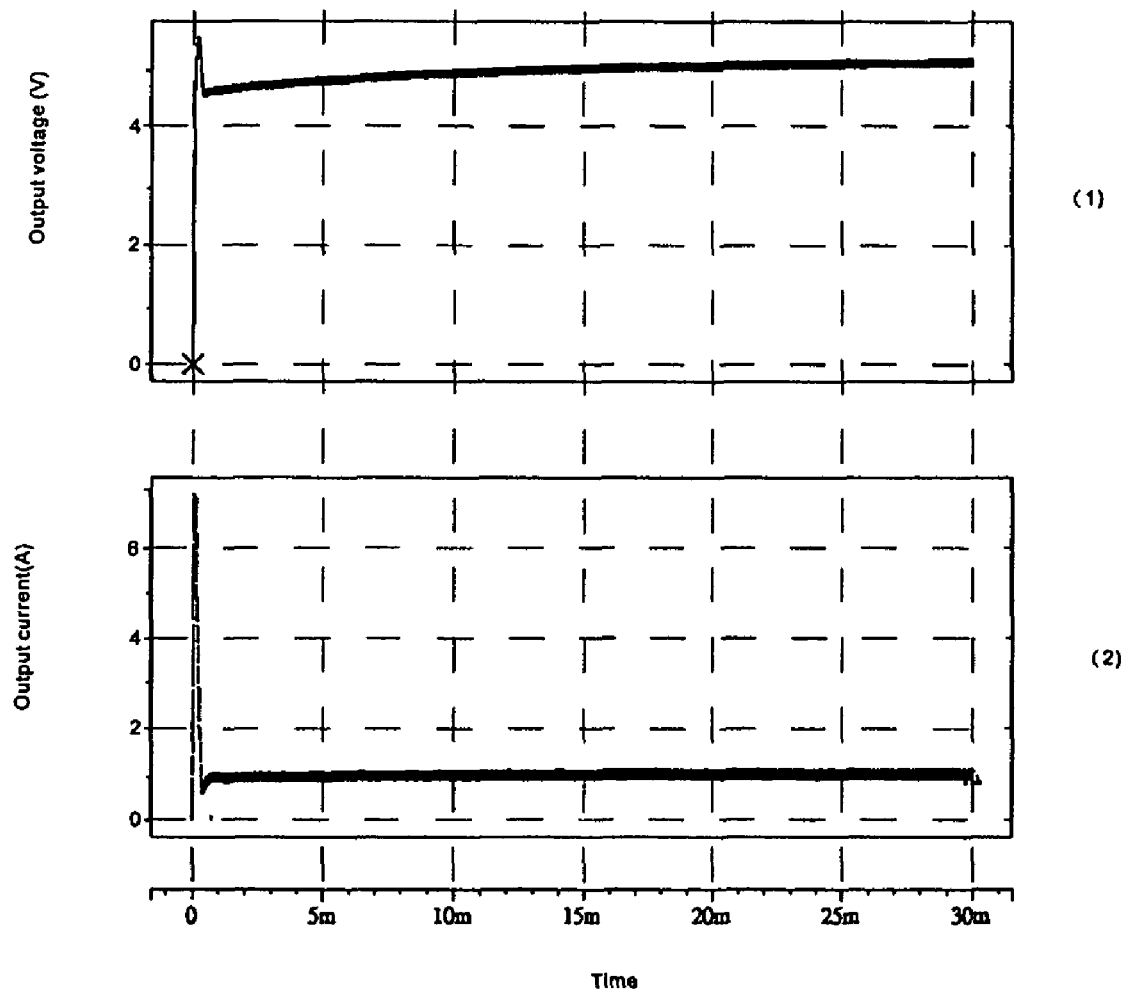
FIG. 7 shows voltage and current waveforms of a switch-type voltage regulator without soft-start protection.

FIG. 7 shows output voltage and output current waveforms of a switch-type voltage regulator without soft-start protection. As can be clearly seen from FIG. 7, in the switch-type voltage regulator without soft-start protection, the circuit will instantaneously output excessively high voltage and current when the circuit is turned on, rendering the power conversion system to damages caused by overvoltage and overcurrent.

Figure 8:
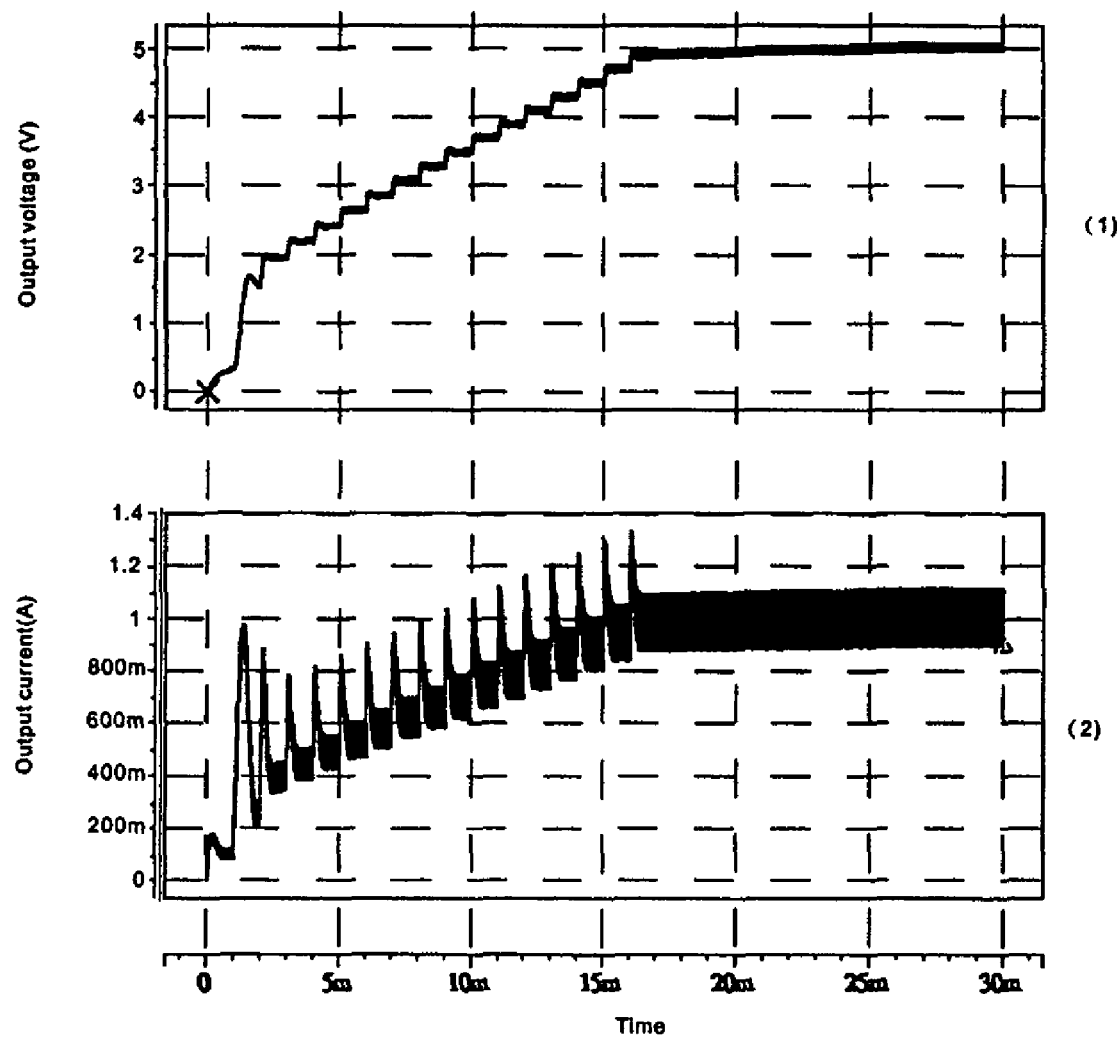
FIG. 8 shows voltage and current waveforms of a switch-type voltage regulator with soft-start protection according to the present invention.

FIG. 8 shows voltage and current waveforms of a switch-type voltage regulator with soft-start protection. As can be clearly seen from FIG. 8, in the switch-type voltage regulator with soft-start protection, when the PWM output begins, the duty cycle slowly rises, so that both of the output voltage and the output current have the characteristic of soft starting to achieve the purpose of protecting the power conversion system against overvoltage and overcurrent.

What is claimed is:

1. A pulse width modulated (PWM) controller applied to a switch-type voltage regulator, comprising:
    an error amplifier for receiving a reference voltage signal and a feedback voltage signal, and outputting an error current signal according to the received reference voltage signal and feedback voltage signal;
    a soft-start control circuit for outputting a compensating current signal according to at least one soft-start control signal;
    a compensating load for receiving the error current signal and the compensating current signal, and outputting a compensating signal according to the received error current signal and compensating current signal; and
    a comparator for receiving a ramp signal and the compensating signal, and outputting a pulse width modulated (PWM) signal;

wherein the soft-start control circuit includes at least one bias current source and at least one control switch corresponding to the at least one bias current source, in which the bias current source generates a bias current corresponding to the error current signal, and the at least one control switch controls outputting of the bias current according to the at least one soft-start control signal so as to form the compensating current signal;

wherein the soft-start control circuit outputs a largest value of the compensating current signal at the beginning of a soft-start control cycle;

wherein the soft-start control circuit outputs a smallest value of the compensating current signal at the ending of the soft-start control cycle.

2. The PWM controller applied to a switch-type voltage regulator as claimed in claim 1, wherein the compensating load includes a resistor.

3. The PWM controller applied to a switch-type voltage regulator as claimed in claim 2, wherein the error amplifier is a transconductance amplifier.

4. The PWM controller applied to a switch-type voltage regulator as claimed in claim 3, wherein the error amplifier includes:

a reference current source for generating a reference current; and a transconductance differential amplifying unit for generating the error current signal according to the reference voltage signal and the feedback voltage signal as well as based on the reference current.

* * * * *